April 16, 1968     F. F. OFFNER     3,378,825
APPARATUS FOR SUMMATION OF SIGNALS BY PULSE SAMPLING
Filed Nov. 21, 1963     2 Sheets-Sheet 1

INVENTOR
Franklin F. Offner
BY Pierce, Scheffler & Parker
ATTORNEYS

April 16, 1968 F. F. OFFNER 3,378,825
APPARATUS FOR SUMMATION OF SIGNALS BY PULSE SAMPLING
Filed Nov. 21, 1963 2 Sheets-Sheet 2
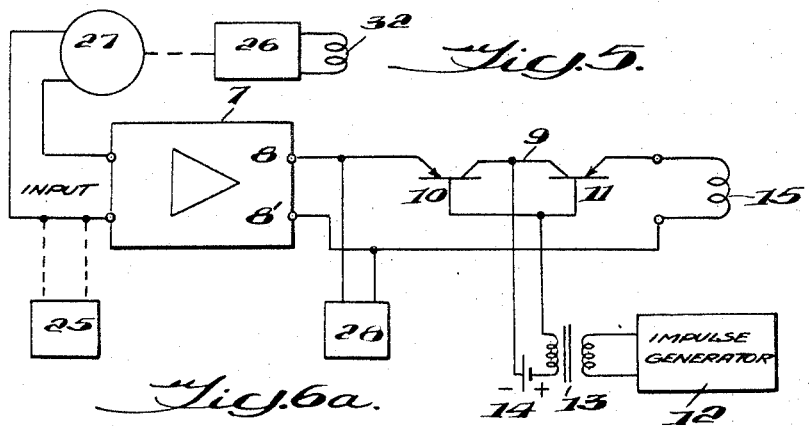
Fig.5.
Fig.6a.
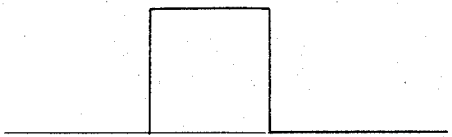
Fig.6b.
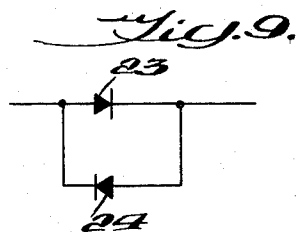
Fig.9.
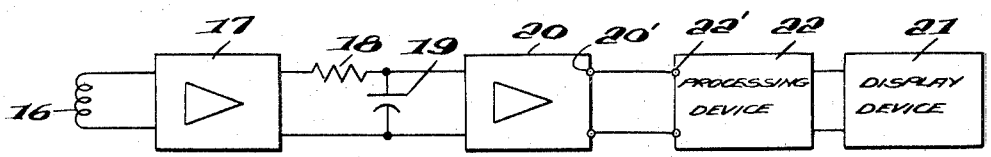
Fig.7.
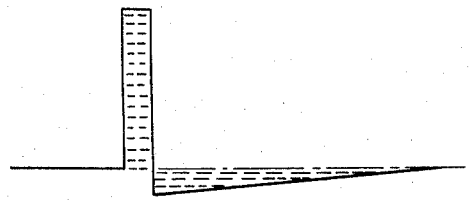
Fig.8.
Fig.10
INVENTOR
Franklin F. Offner
BY Pierce, Scheffler & Parker
ATTORNEYS

United States Patent Office 3,378,825
Patented Apr. 16, 1968

3,378,825
APPARATUS FOR SUMMATION OF SIGNALS
BY PULSE SAMPLING
Franklin F. Offner, 1890 Telegraph Road,
Deerfield, Ill. 60015
Filed Nov. 21, 1963, Ser. No. 325,409
13 Claims. (Cl. 340—174.1)

ABSTRACT OF THE DISCLOSURE

Apparatus for summating electrical signals operates by sampling the signal with repetitive, brief pulses which are amplitude modulated by the signal. The pulses are repetitively applied to a magnetic tape loop at a low mark-space ratio so that few of the pulses from one recording will fall on pulses from succeeding recordings. The total signal is read out as the average of the pulses resulting from the sum of the individual recordings.

This invention relates to data processing means, and more particularly to an improved arrangement for obtaining summation of phenomena for the purpose of improving the signal-to-noise ratio.

In the past, the summation of phenonena, which could be synchronized on a time basis, has been achieved in a number of ways. The first method employed was the visual summation of responses, synchronized on the face of a cathode ray oscilloscope. The second method employed was the storage in a series of capacitors, into which the phenomena was sequentially stored. Subsequently, computers of various types have been used for this purpose.

The present invention provides a method for giving a greater amount of data storage than can be economically handled by past methods, and at a lower cost and complexity.

The method to which the invention relates is based on the following principle. Assume that a phenomenon is initiated at successive times $t_1$, $t_2$, $t_3$, etc. The phenomenon so initiated follows essentially the same time course each time it is initiated, and thus if the phenomenon is represented as $f(t)$, one may write:

$$f(t) = f(t_1+t) = f(t_2+t) = f(t_3+t)$$

etc.

In some applications, particularly in the recording of biological phenomena, the desired response signal $f(t)$, may have superimposed upon it undesired signal potentials, which may be larger than $f(t)$, the desired response. All such undesired signals may be grouped together under the term "noise." The noise is then defined as all signals which are not synchronized with the times $t_1$, $t_2$, etc.

It may readily be shown that if signals are added, so that the signal voltage existing at time $t_1$ is added to the signal at $t_2$, and subsequently $t_3$, $t_4$ . . . ; and similarly at time subsequent to $t_1$, $t_2$, etc., then the signal voltages will add directly, as they will all be identical, or essentially so. However, the noise voltages will not be in any fixed time relationship, and it may be shown that they will add as their square root. That is, the signal voltages will add, while the noise power will add.

Thus, if, for example, 100 responses are added in this way, the signal voltage will be 100 times that of a single response, whereas, the noise voltage recorded will be the square root of 100 times the noise in a single response, or ten times. Thus, the signal-to-noise ratio is improved by a factor of ten.

The present invention accomplishes this result by recording the responses on a magnetic medium. One convenient such medium is magnetic tape of the familiar type and one suitable embodiment thereof will be hereinafter described and is illustrated in the accompanying drawings wherein:

FIG. 5 is a circuit diagram illustrating a suitable circuit for applying signal impulses to the recording head of the novel phenomena summation system;

FIGS. 6a and 6b are signal voltage waveforms obtained from the play-back head of the system;

FIG. 7 is a circuit diagram of an arrangement for converting the signal voltage obtained from the play-back head to substantially its original wave form;

FIG. 8 is a plot of the signal impulse wave form in explanation of an operating characteristic of the summation system;

FIG. 9 illustrates one form of threshold circuit which can be employed with advantage in the summation system according to the invention; and FIG. 10 is a plot of the wave form of a noise signal which may be added to the original signal in an alternative embodiment of the invention.

Figure 1:
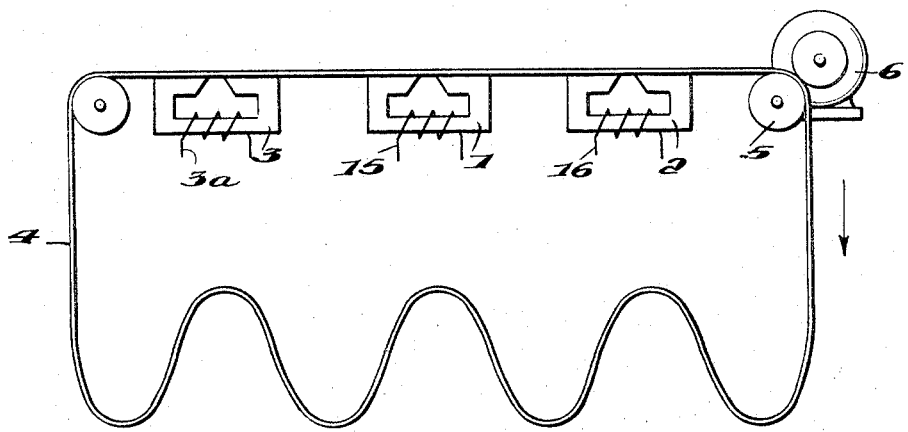
FIG. 1 is a somewhat diagrammatic illustration of one embodiment of the invention for obtaining phenomena summation utilizing tape recorder components.
Figure 2:
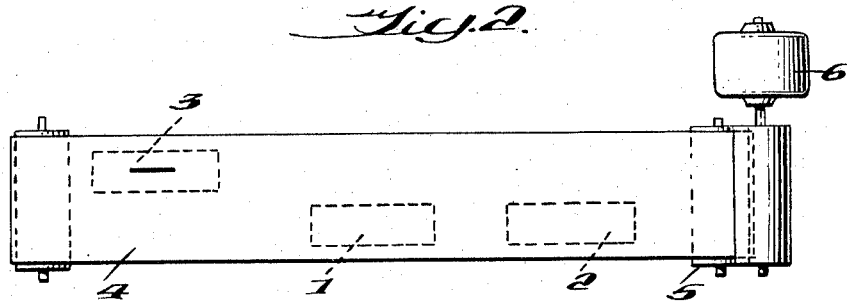
FIG. 2 is a view of the FIG. 1 as seen in top plan.

With reference now to the drawings and to FIGS. 1 and 2 in particular, the magnetic heads associated with the magnetic tape are indicated at 1, 2 and 3. 1 is a recording head, and 2 is a play-back head operating on the same track of tape 4 as head 1. 3 is also a play-back head and this head operates on a synchronizing track of the tape parallel with the track which passes through heads 1 and 2. As will be later explained, the play-back, synchronizing head may be replaced by one of several other types of synchronizing devices. The tape is driven by drive roller 5, turned by motor 6 at a substantially constant rate. As illustrated, the tape is of the form of a loop, so that it is repetitively passed over the tape heads 1, 2 and 3.

In operation, a synchronizing impulse is established on the track which is reproduced by head 3. This impulse may have been earlier recorded by applying an impulse to head 3, thus having it at this moment operate as a recording head, or the tape may have the synchronizing impulse recorded in any other manner. As the tape continually rotates, each time it passes the synchronizing mark, an impulse is picked up from the coil of head 3. This impulse may be amplified, and used to initiate the phenomenon. The phenomenon to be summated is then applied, in a manner to be subsequently disclosed, to the coil of head 1. Recording is accomplished either continuously, in the event that a phenomenon is to be initiated on each passage of the loop; or during a fixed period of time, not longer than the time of passage of one circuit of the loop, in the event that the phenomenon is to be recorded on only some passages of the loop. For example, the loop may be of five seconds duration of travel, but it may be desired to only record a phenomenon every minute, or at odd and varying intervals of time. If, for example, the phenomenon is to be initiated every minute, a counter may be employed so that the impulse head 3 is used to initiate the phenomenon only on every twelfth turn of the loop. If varying intervals are to be employed, then a switch, for example, may be used in series with head 3, the switch being closed at an instant before the phenomenon is to be initiated. The phenomenon will then be initiated on the next passage of the loop, at the instant the synchronizing impulse passes head 3. Recording is then initiated at this instant, and continued for not more than the passage of one loop. The switch must also be opened before the synchronizing pulse passes under head 3 a second time.

Although it might at first glance appear that such a system would work directly as described, with the phenomenon to be recorded continually applied to the coil of head 1, it may be readily seen that this is not possible. The magnetization of the tape will not in such a method be the summation of the impulses added on each passage, because of the nature of magnetization curves. Rather will the signal recorded be more nearly representative of the last applied signal.

Figure 3:
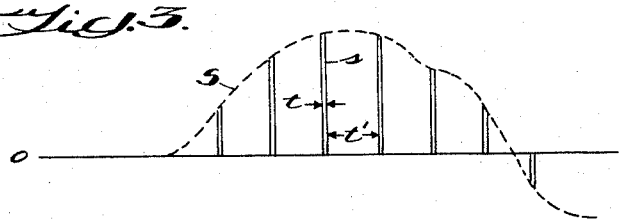
FIGS. 3 and 4 are graphs indicating characteristics of the signal voltage.

The system of recording actually employed is explained by FIGURE 3. The signal voltage wave is represented by the dashed line S. The signal wave is sampled by a commutating device for brief instants or intervals, which may be periodic, but are not necessarily precisely so. The sampling is preferably for an interval $t$ which is short compared with an interval $t'$ between samples; for example, the sample to sample interval, or "mark-space" ratio may be 1:1000. These signal samples S are now recorded on the tape by being applied to head 1. It will be noted that the samples are positive when the signal is positive, and negative when the signal is negative.

Figure 4:
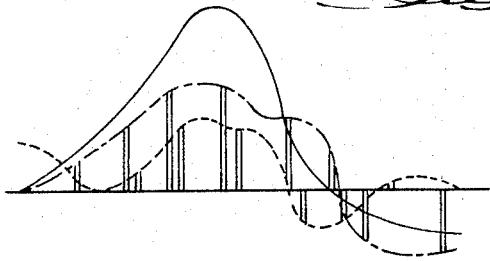

On the next passage of the tape during which a further recording is made, the signal will again be added. Because of the small mark-space ratio, there will be small probability that the second application of the signal samples will fall in the same region as the first signal so applied. However, a few such super-positions will not seriously interfere with the functioning of the system. An example of the recording with two such superposed responses is shown in FIGURE 4. Here the dashed response is the first passage, as illustrated in FIGURE 3, and the dotted line is the second response. The solid line now represents the sum of these two responses, as would be read by head 2, with the aid of auxiliary circuitry to be later described. Of course, the addition of two responses will only make a minor improvement in signal-to-noise ratio, but it is readily apparent that this super-position of responses may be continued until the number of responses approaches the ratio of space-to-mark, so that an appreciable number of responses start to be lost by super-position.

While the random placement of samples on the tape is in general satisfactory, it is apparent that if greater precision is desired, the placement of the responses may be programmed, so that succeeding responses will fall in successive order, or in any other desired order, and the maximum number of responses may thus be super-posed without random loss due to super-position.

A circuit suitable for applying the signal samples S to coil 15 of head 1 is shown in FIGURE 5. Here 7 is a signal amplifier which receives the signals S at the terminals legended "input," the signal to the input being triggered "on" when the synchronizing recording Syn on tape 4 reaches the head 3. Preferably the amplifier is characterized by having a high output impedance, so that the output current is essentially independent of the impedance of the load. In series with one of the two output terminals 8, 8' is placed transistor commutator 9, consisting of transistors 10, 11. These transistors are arranged in the well known commutating mode, and are commutated by impulses of the proper mark-space ratio and frequency, generated by impulse generator 12. The commutating impulses are applied through transformer 13. A source of bias potential may be inserted in series with the commutating signal, shown schematically as a battery 14. The purpose of this biasing voltage is to completely eliminate signal transmission during the space interval of generator 12. However, in some cases the additional biasing voltage may not be required, depending upon the characteristics of transistors 10 and 11, and the impedance relationships of the circuit. With this circuit, short samples S of the signal wave in the form shown in FIGURE 3 can be recorded on the tape 4 of FIGURE 1. That is, the magnetization of the tape will be essentially in impulse form, as illustrated in which the signal appears as a series of recorded segments.

In the particulars of the circuit shown in FIG. 5, the coil 15 for magnetizing the recording head 1 is connected to the output terminals 8, 8' of amplifier 7 through a switching arrangement consisting of the two transistors 10 and 11 connected in series between terminal 8 and one side of coil 15. The emitters of these two transistors 10 and 11 are connected respectively to output terminal 8 and one side of coil 15 and the two collectors of the transistors are connected together. In order to produce the commutating action in the transistors, impulse generator 12 supplies impulses to the primary of transformer 13, and the impulse voltage output of the secondary of this transformer is applied between the interconnected collectors and the interconnected bases of the two transistors. The bias potential referred to, illustrated as battery 14 is connected in series with the transformer secondary.

As is well known, with longitudinal magnetization of the tape in the customary manner, the signal reproduced by play-back head 2 will be essentially the space derivative of the magnetization; that is, the rate-of-change of the magnetization in the tape in the direction of travel. In FIG. 6a is illustrated an originally applied impulse, on a greatly expanded time scale. In FIG. 6b is shown the signal that would be reproduced by coil 16 of play-back head 2. The broadening of the derivatives is of course due to lack of infinite time resolution at the recording and play-back heads.

It is necessary to convert the dual impulses of FIGURE 6b to something resembling the original waveform. This is accomplished by integration, as illustrated in FIGURE 7. Here the signal generated by coil 16 of play-back head 2 is first amplified by amplifier 17, then integrated by resistance capacitor combination 18, 19. The integrated signal is further amplified by amplifier 20, for display on a suitable waveform display device 21. 21 may be a cathode ray oscillograph, a direct-writing oscillograph, or other desired device. It may also be a second tape recorder, in the event that it is desired to store the summated voltage waveform after processing, for further processing, as by computers, etc.

The signal from amplifier 20 is shown to pass through a processing device 22, before being applied to display device 21. Device 22 is an alternative addition to the system, for removing the impulse nature of the sampled signal and producing an output signal which is the average of the recorded impulses. It may be a simple R-C network, similar to that of 18, 19, to smooth out the impulses. Alternatively it may be a low pass filter, preferably having a high frequency cutoff below the repetition frequency of impulse generator 12.

The circuit is illustrated by FIGURES 5 and 7, and will be operative only if the D-C component of the pulse signal samples is transmitted. If, however, this D-C component is lost, as for example, by having amplifier 20 an A-C amplifier, then necessarily the average signal which is transmitted will be zero. Depending upon the time constant of, for example, amplifier 20, the averaging out of the D-C component may occur sufficiently rapidly to lose the essential nature of the signal. However, if the time constant is long compared to a single impulse, then the "relaxation time" of the amplifier will be long compared to the impulse duration. Concomitantly, the amplitude of the reverse going component of this signal will be small compared with the height of the impulse. This is shown in FIGURE 8. The signal impulse is shown above the line, the shaded area being the D-C component of the impulse. This must be matched by the downward going component, also shown shaded. These two areas are equal. However, since the downward going component is of much longer duration, its maximum amplitude is much less. For example, if the impulse has one-tenth of a millisecond duration, and the relaxation time (time constant) of the amplifier is ten milliseconds, the downward going component will have approximately one-fiftieth the maximum amplitude of the impulse. It is then possible to eliminate the downward going component by the use of a threshold circuit interposed between 20 and 22. Such a threshold device may, for example, with the time constant relations above mentioned, transmit signals only having an amplitude at least one-fiftieth as great as the maximum amplitude recordable on the tape. A very simple threshold device is shown in FIGURE 9. In this, two silicon rectifiers 23, 24 are connected in reverse parallel connection, as illustrated. These rectifiers have the property of only conducting signals when the voltage exceeds a threshold value of approximately 0.4 volt. This would be therefore a satisfactory threshold device for placing between amplifier 20 and the processing device 22, as for example between terminals 20' and 22' thereof, in place of the wire connections shown in FIGURE 7, provided that the maximum output voltage of amplifier 20, as produced by signals generated by the tape, does not exceed twenty volts peak, again assuming the time relations above referred to.

The use of the threshold device, FIG. 9, will, of course, remove from the composite signal any signals which have less than the threshold voltage. It will also distort small amplitude signals, by reducing their amplitude by the amplitude of the threshold device. While this effect could be compensated by the use of a non-linear amplifier subsequent to the threshold device, this is in general not necessary, for the reason to be disclosed below.

In the presence of noise, it may be shown that in actual fact it is not necessary to accurately record the amplitude of the signal, when a super-position technique is employed. If the noise is several times greater than the signal, in fact, there is little to be gained by recording anything other than the polarity of the original signal. Thus, under these conditions, amplifier 7 of FIGURE 5 may in fact have sufficient amplification as to always essentially saturate at all times on the signal, except when it is passing through zero. Then all that would be recorded on the tape would be plus and minus impulses of constant amplitude, depending upon the polarity of the original signal. The mathematical theory of this phenomenon will not be given here, since it has appeared in the technical literature, and the method is employed routinely, notably in the detection of underwater sound. In the preferred embodiment of the present invention, however, there is some attempt to at least partially preserve amplitude information, in order to permit the recording of signals which are not below the noise level. Alternatively, however, the method may be used with saturation impulses, by adding to the signals a "noise" signal, which may, for example, be merely a sawtooth or ramp function, as shown in FIGURE 10. This signal from a noise voltage generator 25 may, for example, be added to the desired signal at the input to amplifier 7 through the doted connections shown in FIG. 5. Its frequency is not critical, but may be of the order of the intermediate range to be recorded. The amplitude should, however, be greater than the peak amplitude of the desired signal. It will be seen that the signal of FIGURE 10 acts as random noise, since it will have equal probability of occurring at any amplitude, being a uniform ramp function; and since it will not be synchronized with the synchronizing signal from 3, it will have equal probability of having any voltage within its range, at any instant.

The addition of the "noise" signal results in the polarity of the recorded pulses on the average being proportional to the amplitude of the signal to be recorded. Thus, in the presence of noise, but with no signal present, 50 out of 100 pulses will be positive and the remaining 50 will be negative. Assuming then that a 1-volt positive signal is added to the noise, there might be 51 positive pulses and 49 negative pulses out of a total of 100; with a 2 volt signal superimposed upon the noise, 52 pulses out of a 100 might be positive and 48 negative. With negative signals added to the noise, the converse result might obtain. Thus the addition of noise results in the obtaining of amplitude information. Without the noise, any positive signal would have resulted in all 100 pulses being positive; and with a negative signal, all 100 pulses would have been negative.

In FIG. 5 is also shown the method by which the signal generation may be synchronized with the impulse from coil 3a of head 3. The impulse from 3a is amplified and generates a phenomenon-initiating signal in element 26. This signal acts, as shown diagrammatically by the dotted connection, on the phenomenon-generating element 27.

A further improvement results, if, as also shown in FIG. 5, a high frequency biasing voltage is added before the gating transistors. Thus, a bias oscillator 28 is connected across the output terminals 8, 8' of amplifier 7 and provides a high frequency bias voltage ordinarily used in magnetic tape recording, for improving linearity. This bias voltage is applied only during the instant the impulse is being recorded. Thus, the presence of the bias will not erase or modify previously recorded information.

In place of having a separate magnetic track and pick-up head 3, synchronizing may be produced by a number of other methods, as above mentioned. For example, a line may be ruled on the magnetic tape, and a photoelectric pick-up employed for syncronizing. Alternatively, a conducting line may be placed on the tape, and an electrical pick-up employed to generate the synchronization. Another method is to provide a perforated hole in the tape, and provide an electrical contact when the hole passes a contact brush.

The synchronizing pulse may be employed in any of the numerous methods of initiating phenomena, as for example, in biological experiments. For example, a synchronizing pulse may be applied to a stroboscopic light, which is flashed into the eyes of a human subject. Amplifier 7 is then employed to record the brain waves of the subject. The result of such an experiment will be the recording of the component of the brain waves due only to the flashing of the light.

While the invention has been described with a magnetic tape method of recording, it will be apparent that many other methods could be employed. Obviously, a magnetic drum could also be used with no other change in the structure. Any other method of recording brief pulses on a medium could also be employed. Among well known methods by which this could be accomplished, besides magnetic recording, are electrostatic recording, mechanical inscription, and photographic methods.

In conclusion, while I have described and illustrated one suitable embodiment of the improved data summation system in accordance with my invention, it is to be understood that various modifications and arrangement of the component parts may be made without, however, departing from the spirit and scope of the invention as defined in the appended claims.

I claim:

1. Apparatus for summating signals comprising a recording medium, means for producing time-spaced samples of said signal in impulse form, the sample period being short in relation to the interval between successive samples, means for subjecting the same recording medium repetitively to said sample impulses, bias oscillator means producing a high frequency alternating current signal and means applying said bias oscillator signal to said recording medium only during the time of application of said sample impulses.

2. Apparatus for summating signals comprising a recording medium, means for producing time spaced samples of said signals in impulse form, means for repetitively applying said sample impulses to said recording medium, and means to read out the sample impulses as recorded on said recording medium, said read-out means producing an output signal which is an average of the recorded impulses averaged over a period of time longer than the time between successive recorded impulses.

3. Apparatus for summating signals as defined in claim 2 and which further includes means for limiting the averaged signal to that portion of the signal which exceeds a predetermined threshold amplitude in both positive and negative directions.

4. Apparatus for summating signals on a recording medium comprising a signal source, means for applying information to said medium, means for repetitively connecting said signal source to said information applying means, said connecting means being effective during repeated intervals of time and ineffective during succeeding longer intervals and means to read-out the information recorded on said recording medium, said read-out means producing an output signal which is an average of the recorded information averaged over a period of time longer than the time between successive recordings.

5. Apparatus for summating signals comprising a recording medium movable relatively to a recording element, said medium being subjected repetitively to the influence of said recording element, signal transmitting means for transmitting signals derived from a signal source, means for initiating generation of signals by said source, synchronizing means for rendering said signal initiating means operative at a specific instant as regards the relative positions of said element and a specified point on said recording medium, and means for connecting said transmitting means to said recording element, said connecting means being effective to transmit said signal for repeated brief periods and ineffective for the intervening longer periods whereby said signal is applied to said recording medium as a series of narrow impulses with a relatively long spacing between successive impulses.

6. Apparatus for summating signals as defined in claim 5 wherein said recording medium is an endless magnetic tape.

7. Apparatus for summating signals as defined in claim 5 wherein said recording medium is an endless magnetic tape and said synchronizing means is constituted by a recording on said tape.

8. Apparatus for summating signals comprising a source of an electrical signal, signal transmitting means connected to said signal source, a magnetizing head connected to said signal transmitting means, a magnetizable medium movable in relation to said magnetizing head, pulsing means connected to said transmitting means whereby only brief successive samples of said signal are transmitted to said magnetizing head, the interruption between successive samples being longer than the duration of the sampling time, and receiver means for taking off the signal samples recorded on said magnetizable medium by said magnetizing head, said receiver means including means for restoring the wave form of said signal samples to their original form, and a second signal transmitting means connected to the output of said wave form restoring means.

9. Apparatus for summating signals as defined in claim 8 and wherein said magnetizable medium is caused to pass said magnetizing head in a repetitive manner.

10. Apparatus for summating signals as defined in claim 8 wherein said second signal transmitting means includes means excluding signal samples having less than a predetermined absolute value.

11. Apparatus for summating signals as defined in claim 8 wherein said second signal transmitting means includes means for averaging the signal sample output for a predetermined period of time.

12. Apparatus for obtaining the average of repetitive signals comprising a magnetic recording medium, a recording head, said recording medium including a track which passes said recording head in a repetitive manner, means for evoking a signal from a signal source, synchronizing means actuating said signal evoking means at a predetermined time relationship as between a point on said recording medium and said recording head, and means for transmitting said signal to said recording head, said signal transmitting means including a commutating means operative to connect said signal to said recording head during brief repetitive periods of time and which are spaced from each other by comparatively longer periods of time whereby short samples of said signal are recorded in impulse form.

13. Apparatus as defined in claim 12 and which further includes means for reading out the signal recorded on said magnetizable medium, said read-out means producing an output signal proportional to the averaged amplitude of the impulses recorded during said period of connection.

References Cited

UNITED STATES PATENTS

| | | | |
|---|---|---|---|
| 3,226,685 | 12/1965 | Potter | 340—174.1 |
| 3,267,448 | 8/1966 | Gunther | 340—174.1 |

BERNARD KONICK, *Primary Examiner.*

R. SNIDER, *Assistant Examiner.*